Nov. 14, 1961 P. R. JOHNSON 3,008,592
POWER OPERATED STEERING MECHANISM FOR
SIX-WHEEL ARTICULATED SHUTTLE CAR
Filed Aug. 29, 1957 3 Sheets-Sheet 2
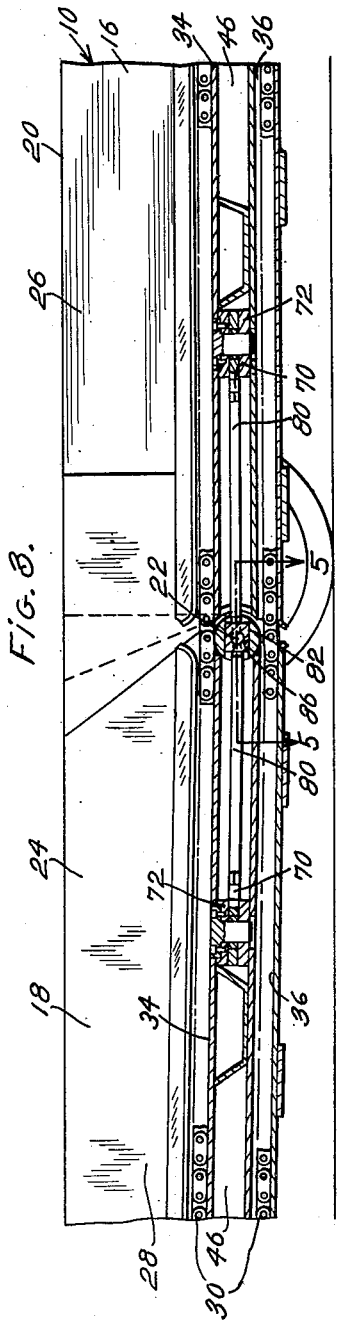
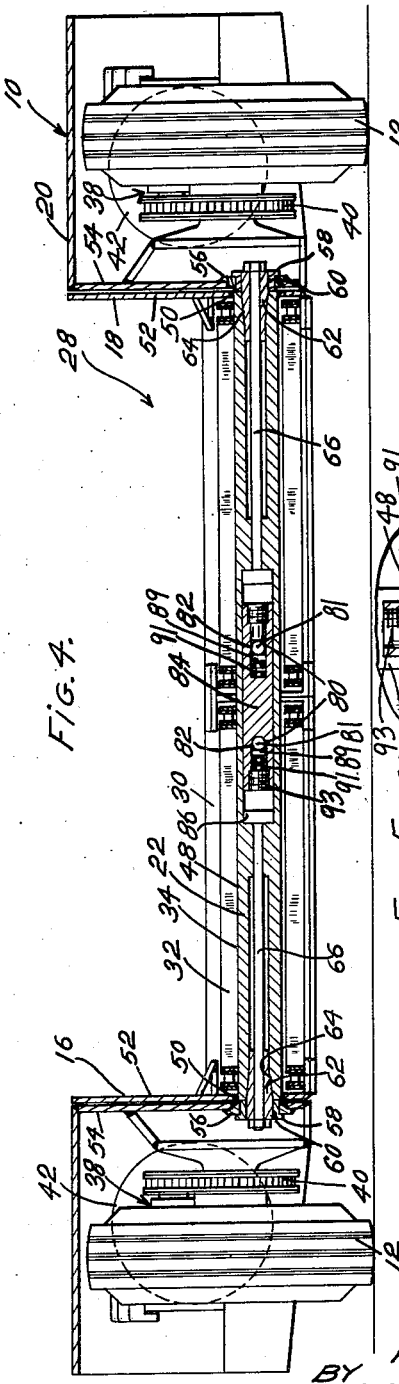
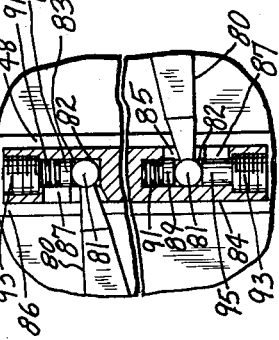
INVENTOR:
PAUL R. JOHNSON.
BY Charles F. Osgood
ATTORNEY.

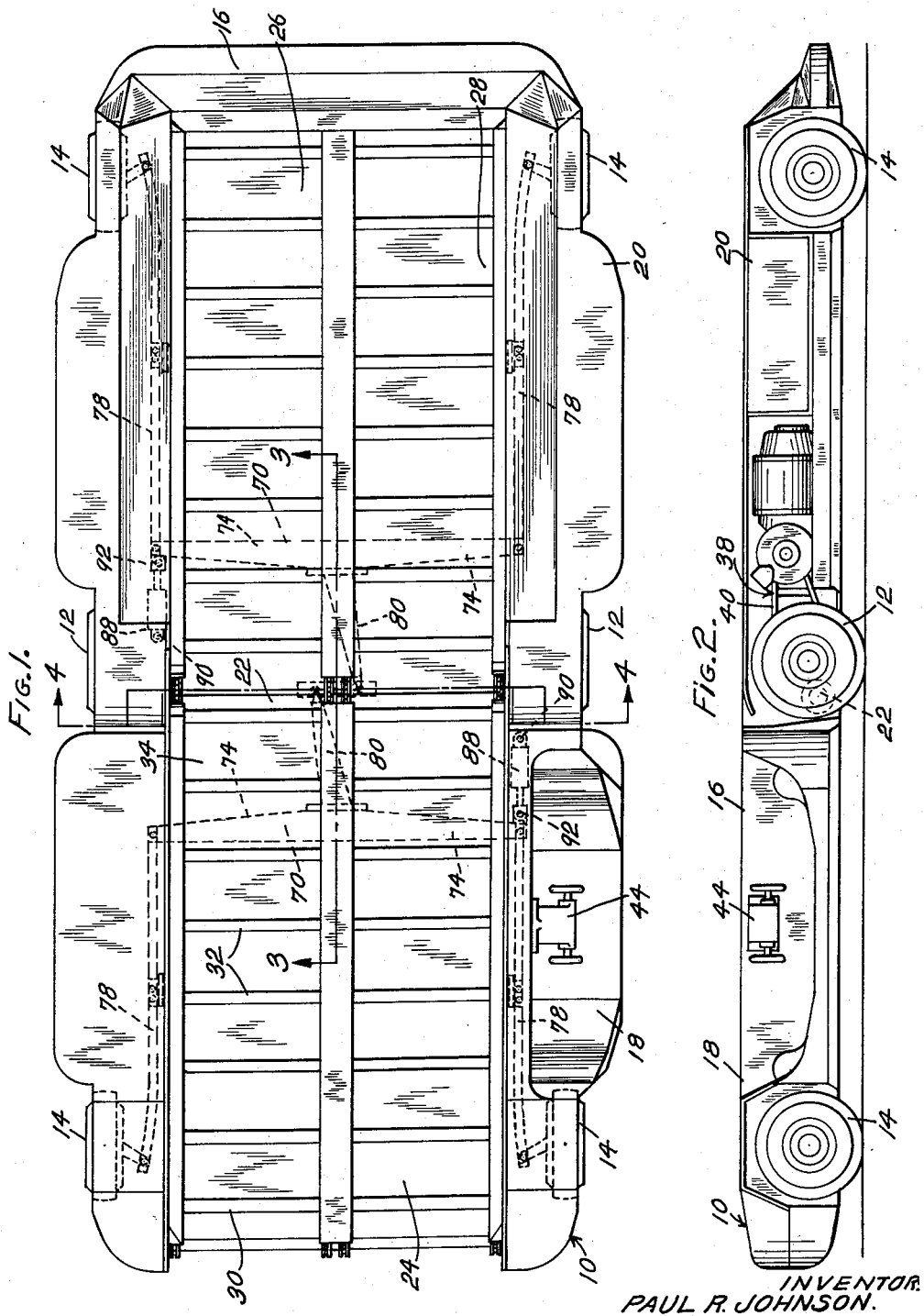

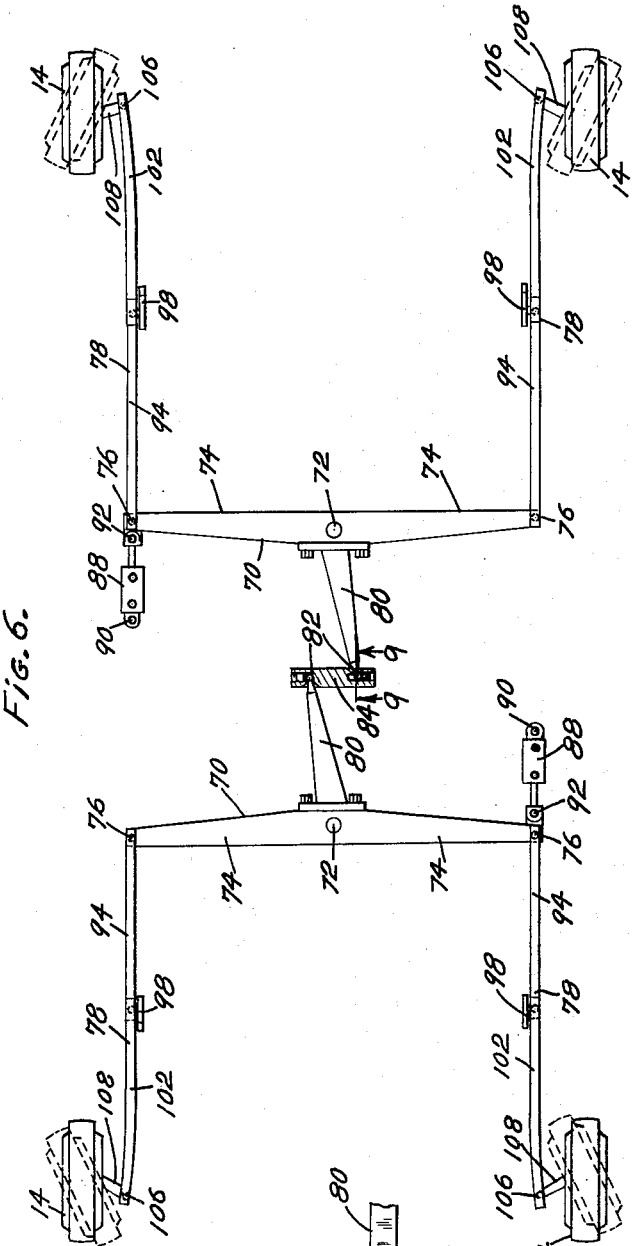

United States Patent Office 3,008,592
Patented Nov. 14, 1961

3,008,592
POWER-OPERATED STEERING MECHANISM FOR SIX-WHEEL ARTICULATED SHUTTLE CAR
Paul R. Johnson, Franklin, Pa., assignor to Joy Manufacturing Company, Pittsburgh, Pa., a corporation of Pennsylvania
Filed Aug. 29, 1957, Ser. No. 680,951
24 Claims. (Cl. 214—83.36)

This invention relates to material haulage vehicles and, more particularly, to improvements in steering means for low-height articulated mine haulage vehicles of the type commonly known as "shuttle cars" used for hauling loose material in underground trackless mines.

Construction of very low shuttle cars designed to carry maximum tonnage dictates use of more than four wheels per car to carry gross vehicle weight. This makes it particularly desirable to have hinging for vehicle articulation near the longitudinal center of the car. An articulating vehicle has been designed with traction driving wheels near the axis of vehicle articulation and with steering wheels at each end. Such a construction creates steering arrangement problems which call for simple, rugged and dependable steering, uniformly controlled by the operator through a single control.

A primary object of the present invention is to provide an improved steering means for a vehicle having articulated body parts, with each part carrying swivelled steering wheels.

Another object is to provide controlled steering means in articulating vehicle body parts for steering wheels at each end of the articulated vehicle controllably tied together so as not to have motion imposed upon the steering linkage means within the body parts relative to the respective body parts by articulation of the vehicle.

A further object of the present invention is to provide an improved vehicle having articulating pivot means between two main body parts and having non-steering traction wheels mounted to the car in the region of the axis of vehicle articulation with improved positive steering means for steerable wheels mounted at each end of the vehicle.

Further objects and advantages will appear in the following description and appended claims when read in conjunction with the attached drawings wherein:

FIG. 1 is a top plan view showing an articulated shuttle car supported by traction driving wheels at the middle and steering wheels at each end connected to my improved steering means.

FIG. 2 is a side elevation of the shuttle car of FIG. 1.

FIG. 3 is an enlarged cross sectional view taken substantially along line 3—3 of FIG. 1 illustrating greater detail of the vehicle articulating means and a portion of my improved steering means and particularly the relation of the steering means to the vehicle articulating means.

FIG. 4 is an enlarged cross sectional view taken substantially along line 4—4 of FIG. 1 showing additional detail of my improved steering means and the vehicle articulating means.

FIG. 5 is an enlarged plan partial cross sectional view taken substantially along line 5—5 of FIG. 3 showing universal ball joint and steering linkage control block detail.

FIG. 6 is a schematic plan view of my improved steering means.

FIG. 7 is a side schematic view of my improved steering means.

FIG. 8 is a partial schematic side view similar to FIG. 7 illustrating a different steering linkage embodiment.

FIG. 9 is an enlarged vertical cross sectional view taken substantially along line 9—9 of FIG. 6 showing a universal ball joint connection of the steering means of one body part with a steering linkage control block between articulating body parts.

The improved shuttle car of FIGS. 1 and 2, which utilizes my improved steering wheel control means for steering wheels at each end of an articulated six-wheel shuttle car, has been developed by Mr. John D. Russell, and is the subject matter of a co-pending application Serial No. 681,004, now Patent No. 2,962,176, filed on the same date, and of common ownership. Evidently the improved steering means may be associated with articulated vehicles of other types.

The shuttle car 10 of FIGS. 1 and 2 is herein, for illustrative purposes, a six-wheeler with center drive wheels 12 and with steering wheels 14 at each end of the car. The material carrying body 16 of shuttle car 10 is divided into two relatively articulating body sections 18 and 20 hinged together by hinged articulating pivot means 22, as disclosed in the Russell application, extending transversely across in the center region of the car 10. Said relatively articulating body sections 18 and 20 have chambers 24 and 26 respectively which cooperate to provide a material receiving compartment, or bin 28, extending lengthwise of the vehicle. Endless orbit conveyor means 30, with scraper flights 32, extends along the compartment bottom or deck 34. As shown in FIG. 3 or 4, the material carrying body 16 is provided with a conveyor return chamber 36 below the compartment bottom or deck 34 in a customary manner. In lieu of the endless flight conveyor disclosed, it will be evident that various other conventional forms of conveyors may be employed.

Non-steering traction wheels 12 are rigidly mounted to the sides of body section 20, and each traction wheel 12 is provided with its own positive driving means 38, including a drive chain 40, from a respective electric drive motor 42 mounted to the respective side of the shuttle car body section 20. The shuttle car 10 is provided with steering control 44 within an operator's compartment. Articulating pivot means 22 permits car body sections 18 and 20 to articulate relative one to the other so that end steering wheels 14 and the traction wheels 12 conform to the mine floor.

Referring now to FIG. 3, body sections 18 and 20 are each equipped with a structural body spacing chamber 46 between the compartment bottom or deck 34 and the conveyor return chamber 36. Each body spacing chamber 46 extends in respective body sections 18 and 20 from the end turns of endless conveyor means 30 near or at the ends of the shuttle car 10 inwardly to the articulating pivot means 22 centrally of the vehicle.

Referring also to FIG. 4, pivot means 22 which is aligned with chambers 46 is comprised of a tubular member 48 fixed as by welding 50 to side plates 52 of body section 18. Each side plate 54 of the body section 20 has a bearing insert receiving member 56 fixed nonrotatably thereto. Flange 58 bearing inserts 60 are nonrotatably mounted to respective bearing insert receiving members 56 and are pivotally supported trunnionlike on respective conical mount members 62. Each conical mount member 62 is tightended into nonrotatable mounting position in a conical opening 64 in the respective ends of tubular member 48 by respective nut and stud assemblies 66.

The preferred steering embodiment of FIGS. 1 through 7 is shown to have T-shaped lever members 70 pivotally supported and aligned by pivot mounting means 72 within respective body spacing chambers 46 of the respective body sections 18 and 20 near the articulating pivot means 22. Each T-shaped lever member 70 has two arms 74 which extend from the respective pivot mounting means 72 to each side of the vehicle where they are pivotally connected 76 to the respective conventional type steering linkage means 78 extending to and operatively connected to respective end steering wheels 14.

Referring to FIGS. 5 and 9, an arm 80 of each T-shaped lever member 70 projects to its respective universal ball joint connection 82 with a rectangular block 84 slidably retained within the slot 86 of tubular member 48 for movement within and axially along the slot 86. Balls 81 of universal ball joint connections 82 are inserted into respective longitudinally aligned holes 83 and 85 of rectangular block 84 through side openings 87. Ball 81 of one universal ball joint connection 82 is held in position between the bottom of hole 83 and spring pad 89 by a spring 91 and a plug 93 threaded into one end of block 84. Ball 81 of the other universal ball joint connection 82 is held in position between spring pad 89 backed by a spring 91 at the bottom of hole 85 and spacer pin 95 held in place by another plug 93 threaded into the other ends of block 84. Springs 91 in this rectangular block 84 linkage means between the steering system of body sections 18 and 20 absorb shock loadings from the respective body section steering systems. It should be borne in mind that other linkage means of various shapes could be used in place of rectangular block 84 also guided by tubular pivot means member 48 in bodily reciprocable movement along the axis of articulation between the vehicle body parts. Each arm 80 may be an integral part of lever member 70 or a separate part mounted to lever member 70 by suitable bolt means.

Power steering cylinders 88 mounted at 90 to the respective body sections 18 and 20 are operatively connected at 92 to the steering means 78 of the respective body sections 18 and 20. Steering means 78 connecting each arm 74 to the respective steering wheel 14 is shown in FIGS. 1, 6 and 7 to have a drag link 94 extending from pivotal connections 76 to a pivotal connection 96 with a drag link pivot arm 98 which is pivotally mounted 100 to the respective body section 18 or 20. An additional drag link 102 extends from a pivotal connection 104 with drag link pivot arm 98 to a universal connection 106 with the respective steering wheel 14 steering arm 108. In the embodiment of FIG. 8, a single drag link 110 extends from pivotal connection 76 to a universal connection 106 with the steering arm 108 with the respective steering wheel 14.

Steering control 44 is provided with valving for the control of power steering cylinders 88. Operation of steering control 44 operates power steering cylinders 88 to pivot lever members 70 about the respective pivot mounting means 72 and transmits such pivot motion through arms 74 and the respective universal ball joint connections 82 with rectangular block 84 which acts to coordinate such motion to the same degree with both lever members 70 for correct synchronized steering of steering wheels 14 at one end of the vehicle as related to the steering wheels 14 at the other end of the vehicle.

The universal ball joint connections 82 of arms 80 with block 84 will fall at all times substantially along the axis of articulation between the body sections 18 and 20. This tie between the steering systems of body section 18 and body section 20 insures positive steering control to all steering wheels 14 without an articulation steering effect being imposed upon the steering wheels 14 in any vehicle articulated state throughout the range of articulation between body sections 18 and 20.

I have herein provided an improved steering means for steering wheels at each end of an articulated vehicle controllably tied together so as not to be affected in operation by articulation of the vehicle. The steering means is so arranged that there is substantially no steering component superimposed on the steering linkage of the vehicle by articulation between vehicle body parts.

While I have shown and described certain embodiments of my invention, various changes and modifications may be effected without departing from the spirit and scope of the invention as defined in the appended claims.

What is claimed and desired to be secured by United States Letters Patent is:

1. In a vehicle having articulated body parts, with pivot axis means connecting said body parts, said parts respectively carrying front and rear swivelled steerable wheels for steering the vehicle as it travels over the ground, traction driven wheels mounted on one of said body sections adjacent said pivot axis means, steering means for said steerable wheels comprising interconnected steering elements extending oppositely between said steerable wheels, an interconnecting member coaxial with said pivot axis means and operatively engaging said steering elements, and said interconnecting member arranged coaxially with said pivot axis means also having bodily shifting movement along said pivot axis means while its coaxial relation with said pivot axis means is maintained.

2. A steering means as set forth in claim 1 wherein said interconnecting steering elements embody linkage elements for the steerable wheels of each body part, and oscillating connections between said linkage elements and said bodily axially shiftable interconnecting member.

3. A steering means as set forth in claim 1 wherein said interconnecting steering elements have rocking movements in both horizontal and vertical planes and operatively engaging said bodily axially shiftable interconnecting member.

4. A steering means as set forth in claim 3 wherein said interconnecting steering elements include oppositely extending levers mounted on said body parts respectively and disposed at opposite sides of said point of articulation, said levers having operative engagement with said bodily axially shiftable interconnecting member.

5. In a vehicle of the character disclosed, an articulating body having a pair of body parts connected in tandem, said body having end dirigible wheels and intermediately located traction wheels, an articulating pivot means defining a pivot axis extending transversely of the vehicle and located centrally of the vehicle between said pair of vehicle body parts, an opening in said articulating pivot means, a linkage member supported and guided within said opening of said articulating pivot means for guided bodily movement back and forth transversely of the vehicle and longitudinally along said axis of said articulating pivot means, steering means in each of said body parts for the respective said end wheels operatively tied together by universal connecting means connecting said steering means with said linkage member.

6. In the vehicle disclosed in claim 5, the articulating centers of said universal connecting means being substantially on said pivot axis between said vehicle parts so as to prevent any steering effect from the articulation of said body parts being imposed upon the said steering means in each of said body parts.

7. In a vehicle defined in claim 5, said linkage member being provided with universal connecting means comprising two universal joints, one for each of said body parts.

8. In the vehicle defined in claim 5, said articulating pivot means comprising a tubular member extending transversely across from side to side of and fixed to one of said body parts, journal mount members nonrotatably mounted to each end of said tubular member by positive mounting means and journal bearing means nonrotatably fixed in an opening on each side of the other of said body parts and rotatably mounted on the respective said journal mount members at each side of said articulated body, said opening of the articulating pivot means being an opening in said tubular member extended through from side to side and extended for a distance along the axis of said tubular member.

9. In the vehicle defined in claim 5, said steering means in each of said body parts comprising a T-shaped lever member pivotally mounted by pivot means to the respective said body parts, a stem lever portion of said T-shaped lever member extending to its respective universal connection with said linkage member and aligned lever arms of said T-shaped lever means extending from said pivotal mounting means to opposite sides of the respective said body parts, steering drag linkage means extending from said pivotal connections with said T-shaped member at each side of said body parts to a pivotal connection with a steering arm of the respective said dirigible wheel.

10. In the vehicle defined in claim 9, the said steering means for each of said body parts including a power steering cylinder mounted to said body parts respectively and pivotally connected to an arm of said T-shaped member at one side of said body.

11. In the vehicle defined in claim 10, the said power steering cylinders of said body parts being mounted to the respective body parts respectively on opposite sides of the vehicle.

12. In a material haulage vehicle comprising two elongated vehicle body parts which are independently tiltable in vertical planes while pivotally connected together at their adjacent ends by a laterally extending articulating pivot means, said body parts having decks extending substantially throughout the length thereof respectively, said respective decks having guiding means mounted thereon, endless conveying means mounted on said decks and guided for movement in an orbit by said guiding means, said conveying means having an upper material conveying portion supported by said decks and a lower return portion lying closely adjacent said upper portion, said articulating pivot means extending transversely across said vehicle from side to side between said upper material conveying portion and said lower return portion of said endless conveying means, said conveying means orbiting in a path normal to said pivot means, dirigible wheels on the remote ends of each of said body parts and intermediately located supporting wheels, steering means mounted in each of said body parts connected to said dirigible wheels respectively, said steering means of said body parts connected by universal connections with a steering connecting member supported and guided by a reciprocable element mounted in said pivot means.

13. A vehicle as set forth in claim 12, wherein said articulating pivot means and the said universal connections of the said steering means of each body part with said steering connecting member all are substantially midway vertically between said upper material conveying and lower return portions of said endless conveyor means.

14. In the vehicle defined in claim 12, said steering means in each of said body parts comprising a T-shaped lever member pivotally mounted by pivot means to the respective body part between the upper material conveying portion and the lower return portion of said endless conveyor means, a stem lever portion of said T-shaped lever member operatively connected to said universal connections respectively, said universal connections are connected respective to said steering connecting member which is supported and guided by said articulating pivot means, aligned lever arms of said T-shaped lever means extending from said pivotal mounting means between the upper material conveying portion and the lower return portion of said endless conveyor means to opposite sides of the respective body parts, and steering control means connected to said T-shaped member at each side of said body parts providing steering control connective means with the respective dirigible wheels.

15. In a vehicle of the character disclosed, a vehicle body comprising body parts pivotally connected intermediate the ends of the vehicle on a transverse axis to permit relative tilting movement of the body parts in vertical planes, the vehicle having front and rear steerable wheels near the ends thereof and centrally located traction wheels near the pivot of the body parts, and steering mechanism mechanically interconnecting said front and rear steerable wheels so that they turn in unison in relatively opposite directions comprising a pair of oppositely moving reversing levers one pivoted on each body part to swing in transverse planes which are horizontal when the body parts are both horizontally disposed, a reciprocable connecting element between the adjacent ends of said levers for connecting the latter for movement together and arranged coaxial with the pivot of the body parts and moving axially along said pivot as said levers swing in relatively opposite directions, said reciprocable connecting element having connections with said levers permitting relative tilting of said body parts while operation of said levers and said connecting element is maintained, and oppositely extending connections between said reversing levers respectively and said steerable wheels.

16. A vehicle as set forth in claim 15 wherein said pivot between said body parts includes a cross member extending transversely of the vehicle body and having an internal bore in which said reciprocable connecting element is guided for reciprocable movement.

17. A vehicle as set forth in claim 15 wherein said last mentioned connections include horizontally swingable steering arms for said steerable wheels and longitudinally extending drag links connected to said steering arms respectively, said drag links having operative connections with the remote ends of said reversing levers.

18. A vehicle as set forth in claim 15 wherein power devices are operatively connected to the remote ends of said reversing levers at the opposite sides of the vehicle for swinging said levers to effect steering and means for effecting simultaneous operation of said power devices.

19. A vehicle as set forth in claim 15 wherein said reciprocable connecting element is non-rotatable about its axis of reciprocation and said reversing levers have pivotal connections with said connecting element.

20. A vehicle as set forth in claim 17 wherein a vertically swingable rocker arm is provided for each drag link, and an additional longitudinally extending drag link is pivotally connected to each rocker arm.

21. A vehicle as set forth in claim 15 wherein each reversing lever has transversely extending lever arms to the opposite ends of which said last mentioned connections are operatively connected, and a third generally longitudinally extending lever arm operatively connected to said reciprocable connecting element, said levers being pivoted on axes lying in the central longitudinal vertical plane of the vehicle at opposite sides of the body pivot and spaced apart longitudinally of the vehicle equal distances from a transverse vertical plane in which the pivotal axis of the body parts lies.

22. A mine haulage vehicle comprising, an elongated body having body sections connected at adjacent ends by laterally extending pivot means, said elongated body having supporting wheels at each end thereof and supporting wheels mounted on said elongated body adjacent said pivot means, certain of said wheels being traction wheels for propelling said elongated body as a unit, certain of said wheels being steerable wheels, said body sections having cooperating chambers to provide a trough shaped compartment extending substantially throughout the length of said elongated body, an endless conveying means extending along the bottom of said compartment and guided on said body sections for movement relative thereto, a linkage means supported and guided by said pivot means for linear reciprocable movement therealong, and steering means for the respective said steerable wheels operatively connected to said linkage means for controlled movement thereof, and control means on one of said body sections operatively connected to said steering means for operating said steering means.

23. A steering mechanism for a shuttle car having elongated body parts, pivot axis means connecting said body parts at their adjacent inner ends, said pivot means extending transversely of said body parts, said body parts carrying at least a pair of steerable wheels at their outer respective ends for steering such a shuttle car as it travels over the ground, traction driven wheels mounted on one of said body parts adjacent said pivot axis means, an interconnecting member mounted coaxially with said pivot axis means for movement therein while its coaxial relation with said pivot axis means is maintained, each of said pairs of steerable wheels has steering elements operatively connected thereto for engaging said interconnecting member for simultaneous movement therewith, and control means mounted on one of said body parts operatively engaging said steering elements for controlling the movement of said steering elements and thereby the said steerable wheels for steering such a shuttle car as a unit.

24. A vehicle comprising, a pair of articulating body parts connected at adjacent ends and having dirigible wheels mounted at the remote ends thereof, an articulating pivot means connecting said adjacent ends, said pivot means defines a pivot axis extending transversely of said body parts, traction driven wheels mounted on one of said body parts adjacent said pivot means, a linkage member supported and guided by said articulating pivot means for guided bodily movement back and forth transversely of said body parts and longitudinally along said articulating pivot means, and steering means mounted in each of said body parts and operatively connected to said end dirigible wheels respectively, universal connecting means operatively connecting said steering means with said linkage member.

References Cited in the file of this patent
UNITED STATES PATENTS

| | | |
|---|---|---|
| 1,361,090 | O'Keefe | Dec. 7, 1920 |
| 1,853,817 | Jordan | Apr. 12, 1932 |
| 1,935,746 | Marcum | Nov. 21, 1933 |
| 2,251,584 | Fageol et al. | Aug. 5, 1941 |
| 2,588,341 | Beck | Mar. 11, 1952 |
| 2,590,300 | Dudley | Mar. 25, 1952 |
| 2,618,491 | Lee | Nov. 18, 1952 |
| 2,757,809 | Hagenbook | Aug. 7, 1956 |

FOREIGN PATENTS

| | | |
|---|---|---|
| 488,278 | France | June 12, 1918 |